BASEBALL GLOVE WITH PRE-FORMED POCKET

Original Filed Jan. 10, 1955 2 Sheets-Sheet 1

BASEBALL GLOVE WITH PRE-FORMED POCKET

Original Filed Jan. 10, 1955 2 Sheets-Sheet 2

United States Patent Office

Re. 24,610
Reissued Feb. 24, 1959

24,610

BASEBALL GLOVE WITH PRE-FORMED POCKET

Henry Denkert, Johnstown, N. Y., assignor to M. Denkert & Company, Johnstown, N. Y., a partnership Original No. 2,750,594, dated June 19, 1956, Serial No. 480,660, January 10, 1955. Application for reissue June 16, 1958, Serial No. 742,455

6 Claims. (Cl. 2—19)

Matter enclosed in heavy brackets [ ] appears in the original patent but forms no part of this reissue specification; matter printed in italics indicates the additions made by reissue.

The present invention relates to baseball gloves of improved construction, the term "glove" being used broadly to include "mitts."

A base ball glove customarily comprises an outer shell member and an inner shell member or lining, with padding between the lining and the shell. When the glove is used, the repeated impact of the ball tends to form a pocket in the palm of the glove. This pocket assists in catching and holding the ball. However, with gloves of conventional construction, it takes considerable time for the pocket to form properly and, since the padding can shift its position, the pocket may not retain its proper shape.

It is an object of the present invention to provide a baseball glove with a pre-formed and lasting pocket in the palm. In accordance with the invention, there is provided a sheet of padding that lies between the outer shell member and lining in the central portion of the palm and a thicker roll of padding between the heel portions of the outer shell member and lining. Between these two portions of padding, the front portion of the outer shell member is attached to the lining to hold the padding in place and define a pocket of determined shape and size. This attachment between the outer shell member and lining is preferably provided by a curved line of lacing that extends approximately from the crotch between the thumb and index finger to the crotch between the ring finger and the little finger. The lacing preferably passes through holes provided in the front portion of the outer shell member and through a strip sewed to the outer face of the lining without the lacing going through the lining. The inner face of the lining is thereby left smooth.

The baseball glove in accordance with the invention is distinctive and attractive in appearance, comfortable to wear and has improved ball-catching and holding characteristics by reason of the pre-formed pocket in the palm.

The nature and advantages of the invention will be more fully understood from the following description and claims in conjunction with the accompanying drawings in which:

Figure 2:
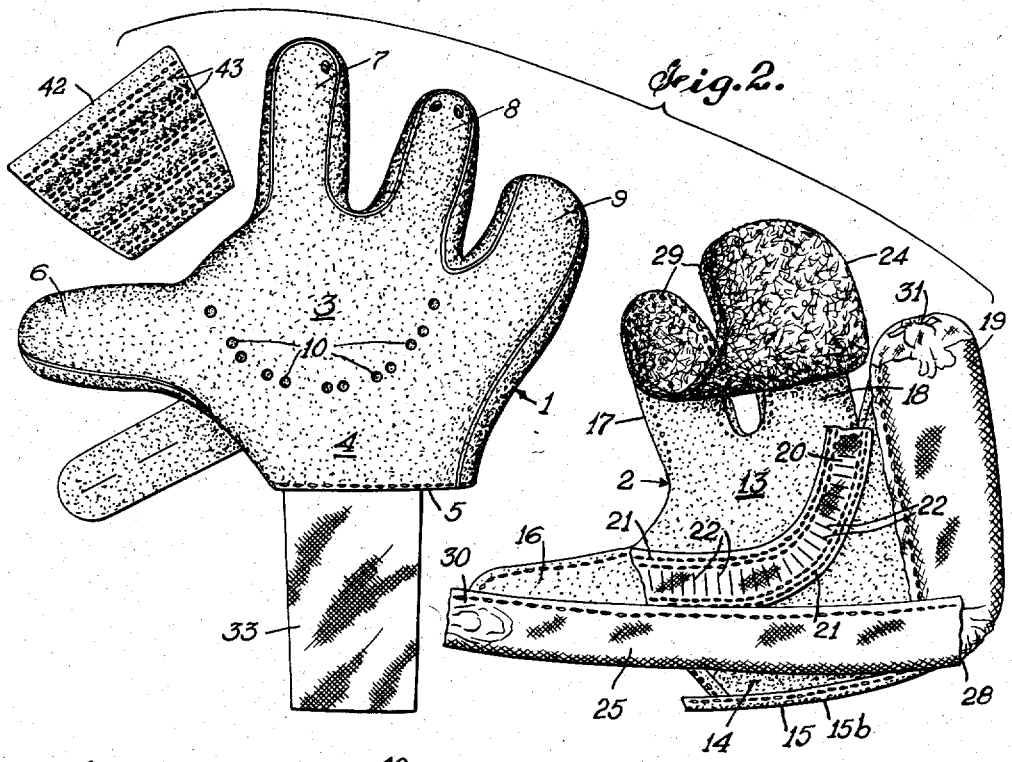
Fig. 2 is an exploded front view showing portions of the glove before assembly.

The glove shown by way of example in the drawings is a three-fingered glove comprising an outer shell member 1 and an inner shell member or lining 2 (Fig. 2). The front of the shell has a palm covering portion 3 and a heel covering portion 4 terminating in a heel edge 5.

Figure 1:
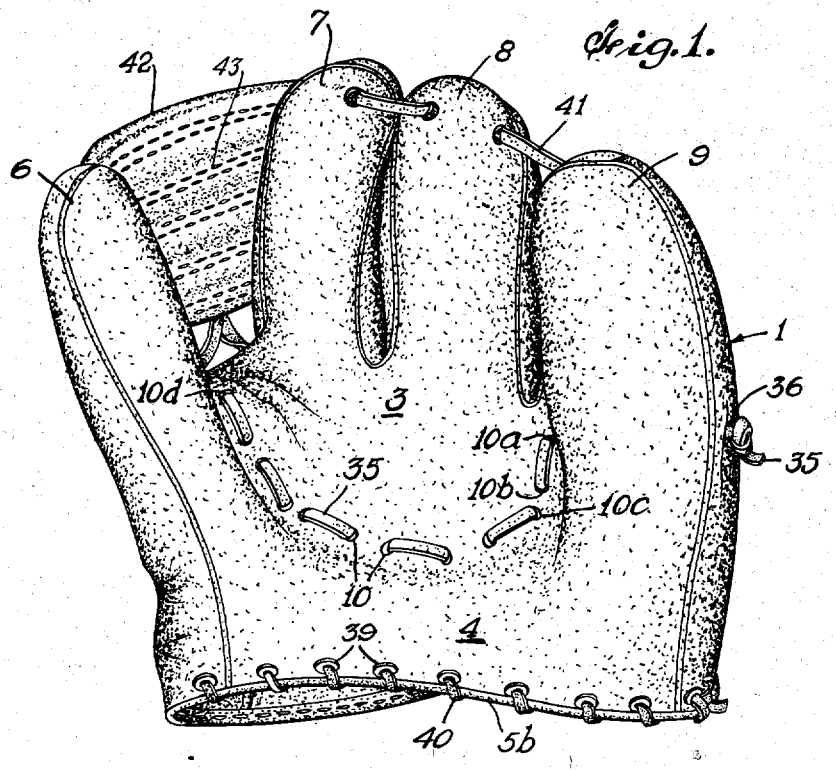
Fig. 1 is a front view of a baseball glove in accordance with the invention.

A thumb portion 6 and fingers 7, 8 and 9 radiate from the palm portion 3 and are shown integral therewith. The finger 9 is herein referred to as the "little finger." A line of perforations 10 in the outer shell member 1 extends transversely across the front of the glove between the palm covering portion 3 and the heel covering portion 4 as shown in Fig. 1. The line of perforations 10 is curved and extends from the crotch between the thumb 6 and finger 7 to the crotch between the finger 8 and the little finger 9. The perforations are shown arranged in pairs with the two perforations of a pair somewhat closer together than the distance between successive pairs.

The outer shell member 1 also has a back 11 (Fig. 5) which is shown as being made of a plurality of pieces sewn together. The shell is preferably made of horsehide or other leather but may, if desired, be made of other flexible sheet material, for example plastic or fabric.

The lining 2 has a palm covering portion 13 and a heel covering portion 14 terminating in a heel edge 15 which is shown as being finished by a binding 15b sewed onto the edge of the lining (Fig. 2). A thumb portion 16 and finger portions 17, 18 and 19 radiate from the palm portion of the lining and are shown as being integral therewith. The lining may or may not have a back portion, as desired, and is of a shape similar to the outer shell member and of such size as to fit into the outer shell member when the glove is assembled. The lining is also formed of leather or other suitable flexible material and is preferably of somewhat lighter weight.

Figure 4:
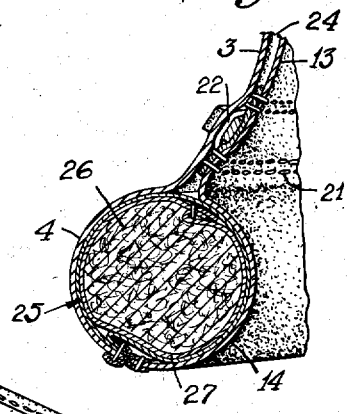
Fig. 4 is an enlarged fragmentary section taken approximately on the line 4—4 in Fig. 3.

A strip 20 of fabric, leather, or other suitable material, is attached to the outer face of the lining—i. e. the face toward the outer shell member—by means of stitching 21 along the edges of the strip. The strip 20 extends in a curved line from the crotch between the thumb 6 and finger 7 to the crotch between the finger 8, little finger 9 in such position as to lie directly under the perforations 10 in the front portion of the outer shell member 1 when the lining and outer shell member are assembled. A series of perforations shown in the form of slits 22 is provided in the strip or tape 20. The slits 22 extend transversely of the strip 20 between the rows of stitching 21. Padding is provided between the front portion of the lining and the front of the outer shell member 1. As illustrated in Fig. 2, the padding comprises a sheet of felted or other padding material 24 which is cut to shape so as to cover the front portions of the two fingers 17 and 18 of the lining and the central portion of the palm portion 13, terminating approximately at the strip 20. In Fig. 2, the lining pad 24 is shown as being folded up in order to show the portions under it more clearly. A thicker padding roll 25 extends inwardly from the outer end of the thumb portion 16 across the heel portion 14 and out to the outer end of the little finger 19. As illustrated in the large scale cross section of Fig. 4, the padding 25 comprises a roll of fibrous or other padding material 26 enclosed in a fabric casing 27. At a point below the little finger, the padding roll 25 is preferably stitched across as indicated at 28 (Fig. 2) so as to provide a "break" permitting the pad to be bent at approximately right angles to itself, thereby conforming to the shape of the glove. The pad 24 is suitably attached, for example by means of stitching 29, to the outer portions of the fingers 17 and 18 of the lining while the ends of the padding roll 25 are attached, for example by tack stitching, to the end portions of the thumb 16 and little fingers 19 at the points indicated at 30 and 31, respectively.

The lining 2, with the pads 24 and 25 thereon, is assembled in the outer shell member 1. A lock strip (Fig. 2) having one end stitched to the inner edge 5 of the heel portion 4 of the shell is carried around the adjacent portion of the padding roll 25 and the opposite end is stitched to the inner edge 5 along with binding 5b. This lock strip 33 thus holds the central portion of the padding roll 25 in place.

Figure 5:
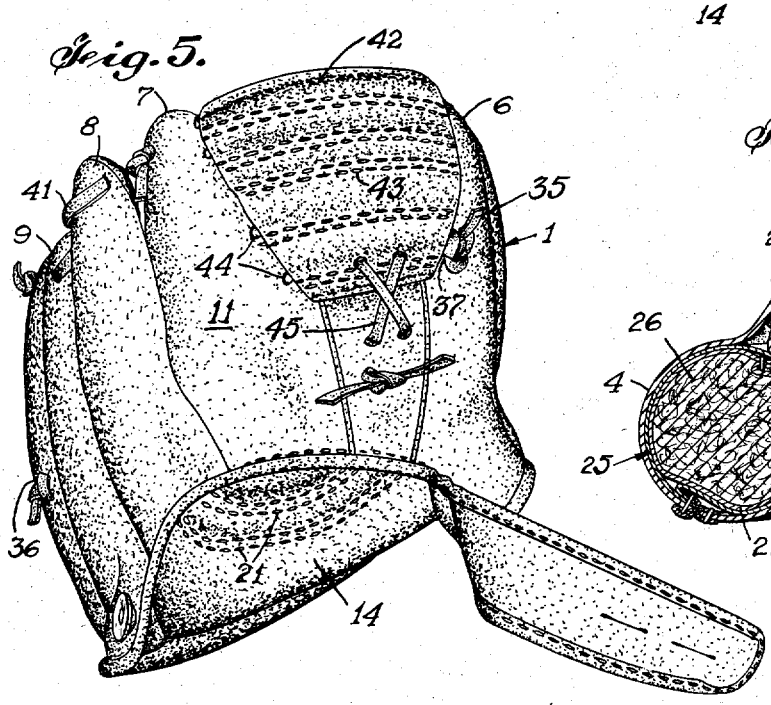
Fig. 5 is a back view of the glove.

A thong or *lacing* [lacking] 35, formed of leather or other suitable material, is laced through the perforations 10 in the front portion of the outer shell member and the underlying strip 20 attached to the outer face of the lining. The thong 35 starts at a point 36 (Figs. 1, 3 and 5) where a hole is provided in the back portion of the outer shell member at the outer side of the little finger. It passes between the padding roll 25 and the lining and comes out at an opening 10a which is the first of the series of openings 10 provided in the palm. The thong then goes in through the next hole 10b, catches the slotted strip 20 secured to the lining and comes out again at the next succeeding hole 10c. The lacing continues in like manner through the rest of the perforations 10. The slits 22 in the strip 20 are sufficiently close together that a curved needle or other lacing instrument inserted through one of the perforations 10 will pass through one slit and come out through a succeeding slit. Hence, although the lacing operation is "blind" operation, in the sense that the operator cannot see the strip 20, it is nevertheless easily and quickly effected. After going into the last of the holes 10 as indicated at 10d (Fig. 1), the lacing passes between the outer shell member and the lining and comes out through a hole at the back of the thumb, as indicated at 37 (Fig. 5). Knots are tied in the ends of the thong to keep it in place and hold it with the desired degree of tightness. It will be seen that the knots in the ends of the lacing 35 are at the back of the glove rather than in the palm. While the lacing has been described as starting at the little finger and proceeding toward the thumb, it can alternatively be effected in the reverse direction.

The lacing 35, laced through the holes 10 in the front portion of the outer shell member 1 and through the slits 22 in the strip 20 attached to the palm portion of the lining, draws the outer shell member down toward the lining along the curved line of the lacing and thereby defines a pocket of determined shape and size in the palm of the glove. The tightness with which the front portion of the outer shell member is drawn in toward the lining can be varied by varying the tightness of the lacing 35. As the lacing 35 does not pass through the lining but only through the strip 20 sewed to the outer face of the lining, the inner face of the lining that is in contact with the player's hand is left smooth, thereby avoiding any discomfort that might arise from contact of the lacing with the palm of the hand. By drawing the outer shell member and the lining together along a curved line between the padding 24 and the padding 25, the lacing 35 assists in retaining the paddings in their proper positions.

Figure 3:
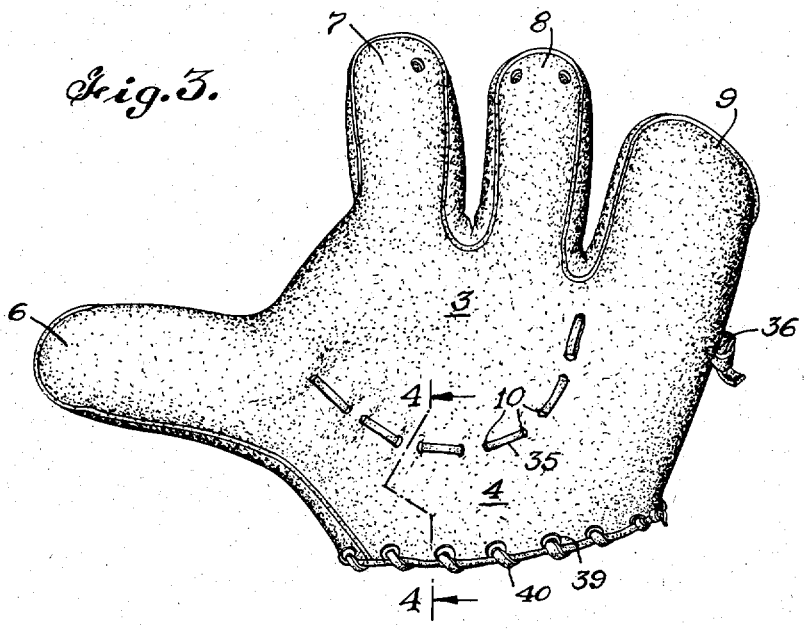
Fig. 3 is a front view of a partially completed glove.

The edges 5 and 15 of the heel portions of the outer shell member 1 and lining 2, respectively, are suitably joined, for example by providing eyeletted holes 39 in the outer shell member and lining along said edges and lacing the edges together by a leather or other thong 40 passing through these holes and over the edges, as clearly shown in Figs. 1 and 3. The glove shown in the drawings also has a lacing 41 between the tips of the fingers and a double thickness web 42 composed of two layers united by rows of stitching 43 and held between the thumb 6 and first finger 7 by means of a lacing passing between the two layers of the web and through suitable holes 44 provided in the shell of the glove. One of these holes is the same as that through which the lacing 35 passes at 37 (Fig. 5), thus reducing the number of holes required. A further lacing 45 is provided between the lower portion of the web 42 and the back portion of the glove between the thumb and first finger.

The invention thus provides a baseball glove of improved construction having a pre-formed and lasting pocket in the palm of the glove and important advantages over gloves heretofore available. While the invention has been shown as applied to a three-fingered glove, it will be understood that it is also applicable to other gloves and mitts and is in no way restricted to the particular example shown in the drawings.

What I claim and desire to secure by Letters Patent is:

1. A baseball glove comprising inner and outer shell members connected along peripheral edges to form a casing, each of said shell members having a front portion comprising finger, palm and heel covering portions, the front portion of said outer shell member having a curved line of perforations extending transversely across it between said palm and heel portions, a perforated strip secured to the outer face of said inner shell member in a position to underlie said line of perforations, palm padding means disposed between the palm portions of said shell members, thicker heel padding means disposed between the heel portions of said shell members, and lacing means extending through said perforations in the outer shell member and through perforations in said strip attached to the inner shell member to *hold* [secure] *superposed portions of* said shell members [to one another] *closely together* along said curved line of perforations, said lacing passing between said palm padding means and said heel padding means and cooperating with said shell members and padding means to *confine said heel padding means and* form a lasting pocket of predetermined shape and size in the palm-covering portion of the glove.

2. A baseball glove according to claim 1, in which said strip is stitched along opposite side edges to said inner shell member and [has] *said perforations are formed as* a series of spaced transverse slits *in said strip* between said stitchings.

3. A baseball glove comprising inner and outer shell members connected along peripheral edges to form a casing, each of said shell members having a front portion comprising finger, palm and heel covering portions, padding means disposed between the front portions of said inner and outer shell members including a pad between the palm portions of said shell members and a padding roll between the heel portions of said shell members, and means securing said outer shell member to a directly underlying portion of said inner shell member along a curved line extending transversely across the front portions of said shell members between said palm portions and said heel portions and [thereby] [securing] *holding* superposed portions of said shell members *closely* together between said pad and said padding roll to *confine said padding roll and* form a pocket of predetermined shape in the palm-covering portion of the glove.

4. A baseball glove comprising inner and outer shell members connected along peripheral edges to form a casing, each of said shell members having a front portion comprising a thumb portion, a plurality of finger portions including a little finger portion, a palm portion and a heel portion, padding means disposed between the front portions of said inner and outer shell members including [a pad between the palm portions of said shell members and] a padding roll having end portions disposed respectively between the thumb portions and the little finger portions of said shell members and an intermediate portion disposed between the heel portions of said shell members, the front portion of said outer shell member having a line of perforations extending transversely across it between said palm and heel portions, a perforated strip secured to the outer face of said inner shell member and extending transversely across said face in a position to lie directly under said line of perforations in the outer shell member and lacing means extending through said perforations in said outer shell member and through perforations in said strip attached to the inner shell member to *hold* [secure] *superposed portions of* said shell members [to one another] *closely together* along said line of perforations, said lacing means [passing between said pad and padding roll and] cooperating with said shell members and said padding *roll* [means] to *confine said padding roll and* preform a lasting pocket in the palm covering portion of the glove.

*5. A baseball glove comprising inner and outer shell members connected along peripheral edges to form a casing, each of said shell members having a front portion comprising finger, palm and heel covering portions, padding means disposed between the front portions of said inner and outer shell members including a padding roll between the heel portions of said shell members, and means securing said outer shell member to a directly underlying portion of said inner shell member along a curved line extending transversely across the front portion of said shell members between said palm portions and said heel portions, and holding superposed portions of said shell members closely together along said line, said securing means cooperating with said shell members and padding roll to confine said padding roll and form a lasting pocket of predetermined shape and size in the palm-covering portion of the glove.*

*6. A baseball glove comprising inner and outer shell members connected along peripheral edges to form a casing, each of said shell members having a front portion comprising finger, palm and heel covering portions, padding means disposed between the front portions of said inner and outer shell members including a padding roll having end portions disposed respectively between thumb covering portions and little finger covering portions of said shell members and an intermediate portion disposed between the heel portions of said shell members and lacing securing said outer shell member to a directly underlying portion of said inner shell member along a line extending transversely across the front portions of said shell members between said palm covering portions and heel covering portions and holding superposed portions of said shell members closely together along said line, said lacing cooperating with said shell members and padding roll to confine said padding roll and form a lasting pocket of predetermined shape and size in the palm-covering portion of the glove.*

References Cited in the file of this patent or the original patent

UNITED STATES PATENTS

| | | |
|---|---|---|
| 1,072,012 | King | Sept. 2, 1913 |
| 1,465,830 | Raymond | Aug. 21, 1923 |
| 2,284,920 | Nolte et al. | June 2, 1942 |
| 2,288,467 | Latina | June 30, 1942 |